Figure 1:
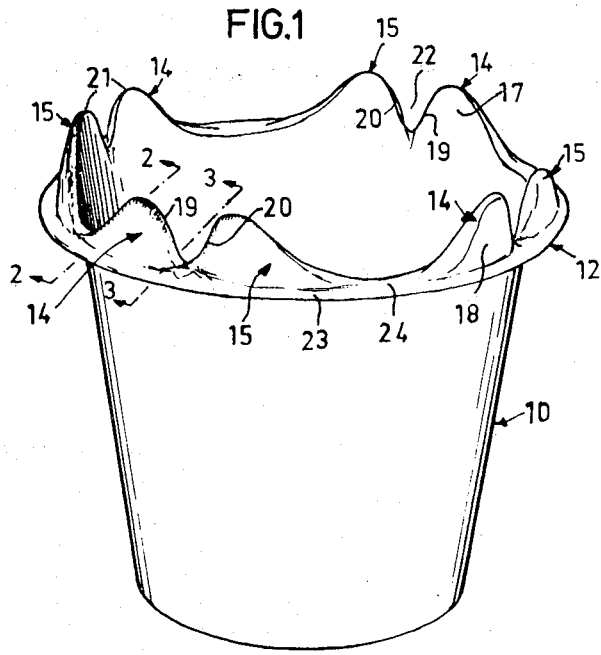

United States Patent
Persson

[11] 3,765,564
[45] Oct. 16, 1973

[54] CUP FOR DENTAL WASTE

[75] Inventor: Karl Rune Persson, Halmstad, Sweden

[73] Assignee: Bila Cup AB, Halmstad, Sweden

[22] Filed: May 21, 1971

[21] Appl. No.: 145,634

[30] Foreign Application Priority Data
May 29, 1970 Sweden.............................. 7456/70

[52] U.S. Cl........................................ 220/90, 32/1
[51] Int. Cl........................................... A61c 19/00
[58] Field of Search................... 220/90, 85 B; 32/1; 206/63.5; 229/1.5 B, 2.5

[56] References Cited
UNITED STATES PATENTS

| | | | |
|---|---|---|---|
| 2,007,523 | 7/1935 | Emery........................... | 229/2.5 UX |
| 3,337,042 | 8/1967 | Bergendal et al.................. | 206/63.5 |
| 3,578,237 | 5/1971 | Weiss............................. | 217/26.5 X |
| 3,122,296 | 2/1964 | Fotos.............................. | 229/1.5 B |

*Primary Examiner*—George E. Lowrance
*Attorney*—Ostrolenk, Faber, Gerb and Soffen

[57] ABSTRACT

A dental cup for waste such as wads and pads of cotton wool, cement rests and the like, comprising a conical beaker made of a plastic foil and having an outwardly projecting flange at its edge. In the flange, there are at least two raised hollow portions defining a V- or U-shaped recess to enable a dental instrument to be applied in the recess and drawn rearwardly to scrape the waste against the edges of the recess.

6 Claims, 4 Drawing Figures

PATENTED OCT 16 1973  3,765,564

CUP FOR DENTAL WASTE

The present invention relates to a cup for dental waste such as pads and wads of cotton wool, cement rests and the like, and is of the type which consists of a concical beaker made of a plastic foil and has at least one recess disposed at the edge thereof to facilitate removal of waste from dental tweezers, spatula and other dental instruments, and wherein the upper edge portion of the cup wall merges with an outwardly projecting flange.

Cups of the type referred to which are flanged below their upper edge surface to form an outwardly projecting lip are known to the art. The lip is intended to rest against the annular support member in which the cup is placed when in use. Above the lip, the wall of the cup as referred to above forms an annular edge portion which is terminated in a straight cut, upper edge. Disposed in the annular edge portion is a number of V-shaped recesses, each of which merges into its respective short slit which terminates short of the aforementioned lip. With this type of cup, sharp edges are obtained on the recesses which can be used to advantage when scraping waste material from the instrument being used. However, this type of cup is less suitable when made from a relatively thin plastics material since the annular edge portion of the cup is then too flexible and yielding, thus causing the scraping edges of the recesses to bend when attempting to remove waste material from the instrument, whereby the waste is not removed effectively and the slots are liable to be torn. In order for such a cup to function satisfactorily, it should be made from a relatively thick plastics material. Since the cup is thrown away after use, however, the use of a thick plastics material renders the cup more expensive than is justified.

The object of the present invention is therefore to provide a thin cup of the type referred to with which the portions thereof used to scrape off the waste have sufficient strength and rigidity in spite of the thin wall thickness.

This is achieved with a cup in accordance with the invention, which is mainly characterized in that the flange has arranged therein two raised hollow portions which define a V- or U-shaped recess in the flange of the cup to enable the dental instrument to be applied in the recess and drawn rearwardly to scrape the waste against the edges of the recess.

The cup is shaped under the application of heat to a conical receptacle from a sheet of plastics foil by means of, for example, vacuum molding in a known manner, the cup being molded with an outwardly extending edge flange at its upper edge surface. The edge flange is provided with at least two raised hollow body portions by subjecting the flange, when hot, to a vacuum molding stage, for example, in which the flange and the region between the wall of the cup and the outer edge of the flange is drawn upwardly. The opposing side edges of the raised portions thus form a V- or U-shaped recess in the edge of the cup, whereby waste can be scraped off against the edges of the recess. The inner wall portions of the raised portions form an extension of the wall of the cup and their outer wall portions are connected at the lower edge surfaces thereof to an annular edge portion of the flange. Since the raised portions thus form hollow bodies, they are relatively rigid, despite the relative thin walls of the cup and the raised portions.

The flange is suitably provided with two, three or four pairs of raised portions. Alternatively, one raised portion in a pair of associated raised portions may merge with an adjacent raised portion of an adjacent pair of raised portions, or the pairs may be separated by smooth portions of the edge flange of the cup.

Two embodiments of the cup according to the invention are illustrated by way of example in the accompanying drawings.

Figure 2:
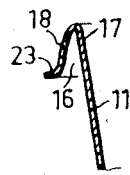
Figure 3:
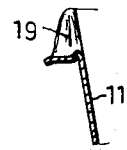
Figure 4:
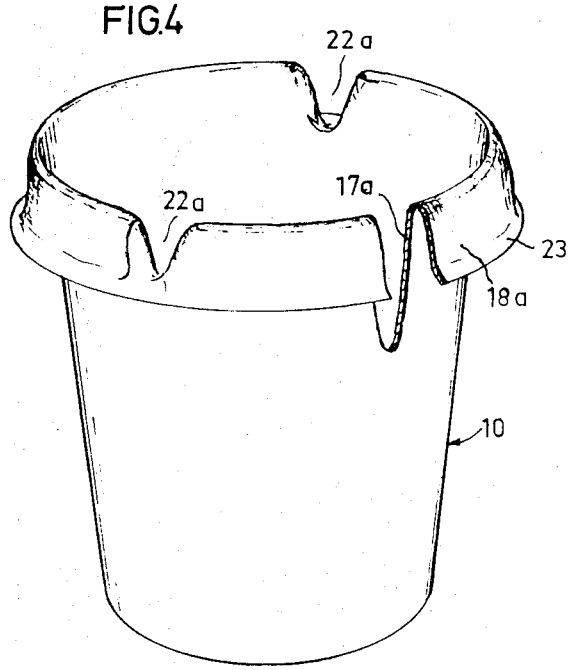

FIG. 1 illustrates in perspective a cup having four pairs of raised portions or promontories in the edge flange of the cup, FIG. 2 is a part section through the line 2—2 in FIG. 1, FIG. 3 is a part section through the line 3—3 in FIG. 1, and FIG. 4 illustrates a simplified embodiment of the cup according to the invention.

The plastics cup 10 in FIG. 1 has a relatively thin wall 11 which merges at its upper edge into a flange or lip 12. When the cup is manufactured by, for example, vacuum molding, the wall 11 is reduced in thickness relative to the thickness of the foil which forms the blank from which the cup is made.

The flange 12, however, has substantially the same thickness as the foil blank and therefore permits deformation of the material by vacuum molding or other heat molding methods. Vacuum molding is applied to produce a number of hollow projections or promontories in the form of associated pairs 14, 15, of which four pairs are shown in the illustrated embodiment. It will be understood that the number of promontories illustrated is not restrictive of the invention but that any desired number may be provided.

Each promontory forms a pocket 16 on the underside of the flange 12 and is defined by an inner wall portion 17 and an outer wall portion 18 and the side edges 19 and 20 connecting said portions. The promontories form substantially triangular projections with a rounded apex 21.

The opposing side edges 19, 20 of a pair of promontories 14,15 form a V-shaped or U-shaped recess 22 in the rim of the cup. The outer wall portions 18 merge at their lower edge surfaces with a narrow edge portion 23 of the flange 12, thereby forming a stiffening ring around the upper end of the cup.

The inner wall portion 17 of the promontories are in the form of continuous extensions to the interior of the cup wall 11, whereby waste which is scraped off against the side edges 19,20 whereby the waste is able to slide freely down into the cup along the inner wall portion 17 and the inner surface of the cup.

As will be evident from the aforegoing the promontories 14, 15 form thin-walled hollow bodies, which despite their small wall thickness have an inherent resistance to bending which is assisted by their connection to the wall 11 of the cup and its flange 12. Thus, the promontories are able to resist the forces to which they are subjected when an instrument is scraped against the edges 19,20 and the bottom of the recess 22.

Because the instrument being used can be readily placed down in the recess and drawn horizontally rearwardly to remove the waste adhered thereto, the working position is comfortable and natural for the person using the cup.

In order to obtain greater rigidity of the promontory, each promontory is arranged to extend only a short distance along the flange. Consequently, with the embodiment illustrated in FIGS. 1–3 the pairs of promontories 14,15 are separated from each other by an unworked portion 24 of the flange.

With the embodiment illustrated in FIG. 4, the promontories between the recesses 22a may be continuous and are formed by causing the inner wall portion 17a and the outer wall portion 18a of the promontories to extend at the same level throughout the whole area between the recesses 22a. This embodiment is somewhat simpler to produce but does not provide for the same rigidity of the upper end of the cup as the embodiment illustrated in FIG. 1. Alternatively, only one recess 22a need be provided.

If the cup is manufactured to fit into an existing annular holder, the cup will rest on the holder through the edge portion or lip 23, which also serves to stiffen the top portion of the cup.

What is claimed is:

1. A dental cup for waste such as wads and pads of cotton wool, cement rests and the like, comprising a conical beaker made of a plastic foil and having at least one recess disposed along the edge of the open end of the cup to facilitate removal of waste from tweezers, spatula and other dental instruments, the upper edge portion of the cup merging with an outwardly and downwardly projecting flange, characterized in that the flange has arranged therein two upwardly extending hollow portions which extend above the upper edge of the cup to define a narrow recess in the flange of the cup to enable the dental instrument to be applied in the recess and drawn rearwardly to scrape the waste against the edges of the recess.

2. A cup according to claim 1 having at least two recesses in the edge thereof, characterized in that the raised portions in the flange of the cup defining the recesses merge into one another at the regions between the recesses and form an even end edge surface of the cup between the recesses.

3. A cup according to claim 1 having at least two recesses in the edge thereof, characterized in that the raised portions in the flange of the cup and defining the recesses are in the form of local promontories separated by non-deformed flange portions in the regions lying between the associated pairs of raised portions, each pair of raised portions defining a recess.

4. A cup according to claim 1, characterized in that, at its free edge, the flange has an outwardly extending edge portion which forms a continuous stiffening ring around the upper end of the cup, the radially outer wall portions of the raised portions connecting at their lower ends with said stiffening ring.

5. A cup according to claim 1, characterized in that the inside of the cup merges continuously with the inner wall portions of the raised portions.

6. A thin walled dental cup for waste such as wads and pads of cotton, cement rests and the like comprising a conical shaped annual sidewall having an opening at one end thereof;

said sidewall at the open end being bent first outwardly and then downwardly to form a continuous flange whereby the continuous free end of said downwardly bent portion lies below the flange to form an interior portion for receiving the upper end of a cup receiving member;

said flange being deformed to provide a pair of upwardly extending projections each having at least one sloping end wall portion, the adjacent sloping portions of said projections cooperatively forming a recess; the said projections each having an inner and outer surface, said inner surface being coplanar with the inner surface of said sidewall and said outer surface being coplanar with the outer surface of the downwardly extending sidewall portion;

said projections being hollow;

said end wall portions being integrally joined to said inner and outer surfaces to strengthen the projections and thereby prevent said projections from being bent when a dental instrument is pulled through said recess.

* * * * *